US010276874B2

(12) United States Patent
Sinsabaugh et al.

(10) Patent No.: US 10,276,874 B2
(45) Date of Patent: *Apr. 30, 2019

(54) HIGH SURFACE AREA FLOW BATTERY ELECTRODES

(71) Applicant: LOCKHEED MARTIN CORPORATION, Bethesda, MD (US)

(72) Inventors: Steven L. Sinsabaugh, Uniontown, OH (US); Gregory Pensero, Abingdon, MD (US); Han Liu, Lutherville-Timonium, MD (US); Lawrence P. Hetzel, Fallston, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/200,955

(22) Filed: Jul. 1, 2016

(65) Prior Publication Data

US 2016/0315328 A1 Oct. 27, 2016

Related U.S. Application Data

(63) Continuation of application No. 14/351,161, filed as application No. PCT/US2012/059632 on Oct. 11,
(Continued)

(51) Int. Cl.
*H01M 4/96* (2006.01)
*H01M 4/86* (2006.01)
(Continued)

(52) U.S. Cl.
CPC ............ *H01M 4/8626* (2013.01); *H01M 4/96* (2013.01); *H01M 8/0228* (2013.01);
(Continued)

(58) Field of Classification Search
CPC ............ H01M 4/86; H01M 4/96; H01M 8/18; H01M 8/0228; H01M 8/188; H01M 8/20;
(Continued)

(56) References Cited

U.S. PATENT DOCUMENTS 6,787,259 B2  9/2004  Colborn et al.
6,911,276 B2  6/2005  Extrand
(Continued)

FOREIGN PATENT DOCUMENTS

EP  2560228 A1  2/2013
JP  S60-253163 A  12/1985
(Continued)

OTHER PUBLICATIONS

Fourth Office Action and Search Report for Chinese Patent Application No. 201280050714.2, dated Aug. 17, 2017, 10 pages.
(Continued)

*Primary Examiner* — Alexander Usyatinsky
(74) *Attorney, Agent, or Firm* — Withrow & Terranova, PLLC

(57) ABSTRACT

A flow cell battery includes at least one anode compartment and at least one cathode compartment, with a separator membrane disposed between each anode compartment and each cathode compartment. Each anode compartment and cathode compartment includes a bipolar plate, a fluid electrolyte, and at least a carbon nanomaterial on the surface of the bipolar plate, wherein the fluid electrolyte flows around the carbon nanomaterial.

26 Claims, 3 Drawing Sheets

Related U.S. Application Data 2012, which is a continuation-in-part of application No. 13/274,495, filed on Oct. 17, 2011, now Pat. No. 8,822,057.

(51) Int. Cl.
| | | |
|---|---|---|
| H01M 8/18 | (2006.01) | |
| H01M 8/0228 | (2016.01) | |
| H01M 8/20 | (2006.01) | |
| H01M 8/0234 | (2016.01) | |
| H01M 4/36 | (2006.01) | |
| H01M 4/48 | (2010.01) | |

(52) U.S. Cl.
CPC ......... *H01M 8/0234* (2013.01); *H01M 8/188* (2013.01); *H01M 8/20* (2013.01); *H01M 4/36* (2013.01); *H01M 4/48* (2013.01); *H01M 8/18* (2013.01); *H01M 2250/10* (2013.01); *Y02B 90/14* (2013.01); *Y02E 60/528* (2013.01)

(58) Field of Classification Search
CPC .... H01M 8/0234; H01M 4/8626; H01M 4/36; H01M 2250/10; H01M 4/48; Y02E 60/528
See application file for complete search history.

(56) References Cited

U.S. PATENT DOCUMENTS

| | | | |
|---|---|---|---|
| 7,309,540 B2 | 12/2007 | Wang | |
| 8,158,217 B2 | 4/2012 | Shah et al. | |
| 8,168,291 B2 | 5/2012 | Shah et al. | |
| 8,822,057 B2 | 9/2014 | Sinsabaugh et al. | |
| 2005/0260473 A1* | 11/2005 | Wang | B82Y 30/00 429/492 |
| 2006/0269827 A1 | 11/2006 | Liu et al. | |
| 2007/0154779 A1* | 7/2007 | Ko | H01M 4/8605 429/492 |
| 2008/0149900 A1* | 6/2008 | Jang | H01B 1/122 252/511 |
| 2008/0160180 A1 | 7/2008 | Debe | |
| 2008/0268318 A1 | 10/2008 | Jang et al. | |
| 2008/0299439 A1 | 12/2008 | Wang | |
| 2009/0081441 A1 | 3/2009 | Shah et al. | |
| 2009/0169996 A1* | 7/2009 | Zhamu | D01F 9/21 429/221 |
| 2009/0208807 A1 | 8/2009 | Miyachi et al. | |
| 2010/0003545 A1 | 1/2010 | Horne et al. | |
| 2010/0033304 A1* | 2/2010 | Takagi | G06F 21/32 340/5.83 |
| 2010/0047671 A1 | 2/2010 | Chiang et al. | |
| 2010/0330419 A1 | 12/2010 | Cui et al. | |
| 2011/0124253 A1 | 5/2011 | Shah et al. | |
| 2011/0244367 A1 | 10/2011 | Watahiki et al. | |
| 2012/0045680 A1 | 2/2012 | Dong et al. | |
| 2012/0219881 A1 | 8/2012 | Sivarajan | |
| 2013/0045400 A1 | 2/2013 | Dong et al. | |
| 2014/0255746 A1 | 9/2014 | Sinsabaugh et al. | |

FOREIGN PATENT DOCUMENTS

| | | | |
|---|---|---|---|
| WO | WO 2010/005954 | * | 1/2010 |
| WO | WO2010/144457 | * | 12/2010 |
| WO | 2011111717 A1 | | 9/2011 |
| WO | WO2011/111717 | * | 9/2011 |

OTHER PUBLICATIONS

Applicant-Initiated Interview Summary for U.S. Appl. No. 14/351,161, dated Aug. 1, 2017, 4 pages.
Advisory Action, Applicant-Initiated Interview Summary, and AFCP 2.0 Decision for U.S. Appl. No. 14/351,161, dated Aug. 24, 2017, 8 pages.
Notice of Allowance for U.S. Appl. No. 14/351,161, dated Sep. 18, 2017, 7 pages.
Fifth Office Action for Chinese Patent Application No. 201280050714. 2, dated Mar. 13, 2018, 7 pages.
Decision of Rejection for Japanese Patent Application No. 2014-537119, dated May 23, 2017, 5 pages.
Final Office Action for U.S. Appl. No. 14/351,161, dated May 24, 2017, 20 pages.
Non-Final Office Action for U.S. Appl. No. 14/351,161, dated Sep. 26, 2016, 15 pages.
Examination Report for European Patent Application No. 12775418. 2, dated Oct. 20, 2017, 5 pages.
Author Unknown, "Components for Flow Batteries: New Markets," SGL Group, May 2011, 16 pages.
Li, Wenyue et at, "Multi-walled carbon nanotubes used as an electrode reaction catalyst for VO2+/VO2+ for vanadium redox flow battery," Carbon, vol. 49, 2011, Elsevier Ltd., pp. 3463-3470.
Lin, S.T. et al., "Multi-walled Carbon Nanotubes Electrodes for the All Vanadium Redox Flow Battery," Energy and Environment Laboratories, Industrial Technology Research Institute, Department of Energy and Resources, and National United University, Taiwan, 2009, 1 page.
Radford, G.J.W. et al., "Electrochemical characterisation of activated carbon particles used in redox flow battery electrodes," Journal of Power Sources, vol. 185, 2008, Elsevier B.V., pp. 1499-1504.
Shao, Yuyan et al., "Electrochemical investigation of polyhalide ion oxidation—reduction on carbon nanotube electrodes for redox flow batteries," Electrochemistry Communications, vol. 11, 2009, Elsevier B.V., pp. 2064-2067.
Shao, Yuyan et al., "Nitrogen-doped mesoporous carbon for energy storage in vanadium redox flow batteries," Journal of Power Sources, vol. 195, 2010, Elsevier B.V., pp. 4375-4379.
Yue, Lu et al., "Highly hydroxylated carbon fibres as electrode materials of all-vanadium redox flow battery," Carbon, vol. 48, 2010, Elsevier Ltd., pp. 3079-3090.
Notification of Reason for Rejection for Japanese Patent Application No. 2014-537119, dated Jun. 21, 2016, 4 pages.
Notice of Eligibility for Grant and Supplementary Examination Report for Singapore Patent Application No. 11201401408X, dated Jun. 20, 2016, 3 pages.
Office Action and Search Report for Taiwanese Patent Application No. 101137933, dated Feb. 17, 2016, 16 pages.
International Search Report and Written Opinion for PCT/US2012/059632, dated Dec. 6, 2012, 9 pages.
International Preliminary Report on Patentability for PCT/US2012/059632, dated May 1, 2014, 7 pages.
First Office Action for Chinese Patent Application No. 201280050714. 2, dated Sep. 2, 2015, 9 pages.
Second Office Action for Chinese Patent Application No. 201280050714. 2, dated May 16, 2016, 9 pages.
Non-Final Office Action for U.S. Appl. No. 13/274,495, dated Jun. 27, 2013, 19 pages.
Final Office Action for U.S. Appl. No. 13/274,495, dated Oct. 24, 2013, 19 pages.
Non-Final Office Action for U.S. Appl. No. 13/274,495, dated Feb. 19, 2014, 19 pages.
Notice of Allowance for U.S. Appl. No. 13/274,495, dated Jun. 11, 2014, 8 pages.
Non-Final Office Action for U.S. Appl. No. 14/351,161, dated Sep. 3, 2015, 11 pages.
Final Office Action for U.S. Appl. No. 14/351,161, dated Dec. 30, 2015, 19 pages.
Notice of Allowance for U.S. Appl. No. 14/351,161, dated Mar. 9, 2016, 8 pages.
Notice of Reason for Rejection for Japanese Patent Application No. 2014-537119, dated Feb. 10, 2017, 11 pages.
Third Office Action for Chinese Patent Application No. 201280050714. 2, dated Jan. 20, 2017, 12 pages.
Decision to Grant a Patent for Japanese Patent Application No. 2017-183532, dated Sep. 28, 2018, 6 pages.
Examination Report for Indian Patent Application No. 2918/DELNP/ 2014, dated Nov. 27, 2018, 6 pages.

(56) References Cited

OTHER PUBLICATIONS

Sixth Office Action for Chinese Patent Application No. 201280050714.2, dated Nov. 5, 2018, 6 pages.

* cited by examiner

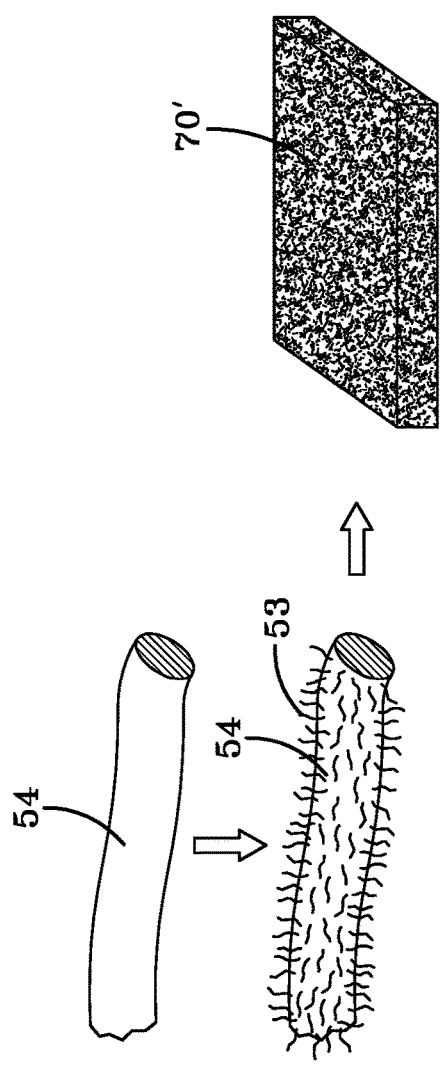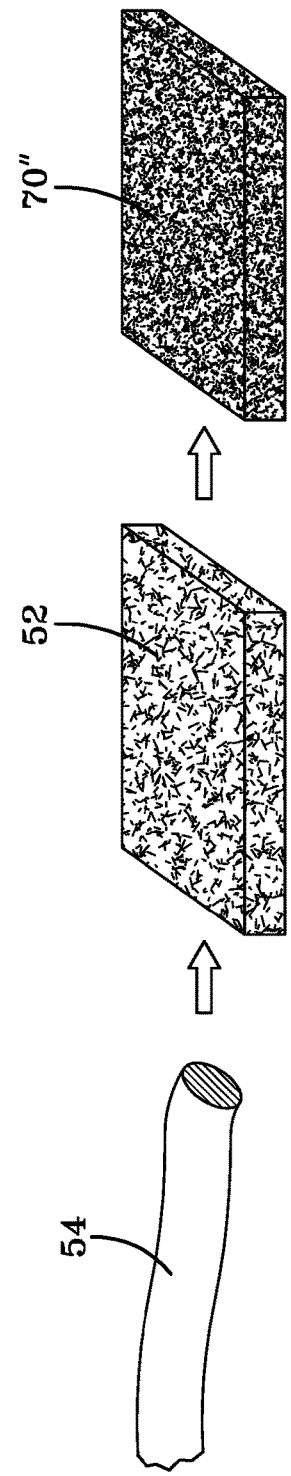

HIGH SURFACE AREA FLOW BATTERY ELECTRODES

CROSS-REFERENCE TO RELATED APPLICATIONS

This application is a continuation of U.S. application Ser. No. 14/351,161 filed on Apr. 11, 2014, which claims priority to International Application No. PCT/US2012/059632 filed on Oct. 11, 2012, which is a continuation-in-part of U.S. application Ser. No. 13/274,495 filed Oct. 17, 2011, each of which is incorporated herein in its entirety for all purposes.

TECHNICAL FIELD

Generally, the present invention is directed to large scale (1 KWh-many MWh) electrical energy storage devices. Specifically, the present invention is directed to rechargeable batteries in the form of flow batteries. In particular, the present invention is directed to improved electrode configurations for flow batteries and potentially other types of batteries.

BACKGROUND ART

With the desire to utilize "green" energy and renewable energy sources, there is a desire to incorporate these intermittent types of energy sources into the power grid. Intermittent sources include, but are not limited to wind, solar, photovoltaics and wave power. For example, if winds are not present, the wind turbines do not generate electrical energy; however, when they do produce energy, the current electrical grid cannot always handle large quantities of the energy produced. Grid connected energy storage devices would enable capturing excess energy from these intermittent renewable energy sources, and releasing the stored energy on the grid when it is needed. This combination of renewable energy sources and grid energy storage would support energy independence, reduced emissions and renewable energy sources. There is also a need for reliable grid energy storage devices so as to relieve transmission congestion, allow for energy price arbitrage, and improve the overall quality of the power grid.

It is believed that flow batteries are a viable solution for creating and improving grid storage. Flow batteries can potentially provide efficient modular energy storage while providing a low cost. They can be independently operated and provide adequate energy and power ratings by utilizing replenishable-liquid reactants and have low cycling impacts and a long life. Flow batteries also have other uses as it relates to microgrid or small power systems and for use as backup power supplies. However, the cost of these systems has prevented wide-scale deployment. A major portion of the system cost is in the flow battery cell stack and the associated anolyte and catholyte. To a large extent, the stack costs are limited by the current density that can be put through the cell stack. A higher current density enables more power to be generated in a given cell stack and effectively decreases the cost per watt. But with current state of art low surface area electrode, higher current density will lead to higher energy loss which increases operational cost. Thus, the electrodes need to have a much greater electroactive surface area, while still managing to minimize cost. Current flow battery systems use carbon-based materials, such as carbon felts, for the electrodes.

Referring to FIG. 1, it can be seen that a known flow battery configuration is designated generally by the numeral 10. The battery 10 is provided in a single cell configuration but skilled artisans will appreciate that multiple cells can be incorporated into a stack, and multiple stacks can be employed. In any event, a flow battery comprises an anode 12 and a cathode 14, both of which are referred to as electrodes. An anolyte tank 16 and a catholyte tank 18 direct respective fluid materials through an anode flow area 22 and a cathode flow area 24. A separator membrane 20 is used to separate the anolyte flow area 22 from the catholyte flow area 24 while allowing ion exchange between the two flow areas. As these materials flow through their respective channels, electrical power is generated by redox reactions, in which electrons are drawn through an external electric load 26 as schematically represented by a light bulb.

Skilled artisans will appreciate that the flow battery is a rechargeable battery in which anolyte and catholyte containing one or more dissolved electroactive species flows through the electrochemical cell that converts the chemical energy directly into electricity. Flow batteries can be recharged by re-flowing the electrolyte liquids through the flow areas as an external electrical power source is applied to the electrodes, effectively reversing the electrical generation reactions. The flow battery is advantageous in that the reaction of active species in the electrolyte permits external storage of reactants, thereby allowing independent scale up of power and energy density specifications. Moreover, the ability to externally store the reactants avoids self-discharge that is observed in other primary and secondary battery systems. As such, the energy is effectively stored in the anolyte and catholyte tanks until needed by the load.

Various chemistries are utilized in the operation of flow cell batteries. In particular, different types of anolyte and catholyte materials may be utilized. For example, the zinc bromine system may be utilized wherein zinc plating is maintained in the cell stack. These types of configurations utilize high efficiency and low cost reactants. Vanadium redox technology may also be utilized. This provides high efficiency but low energy density. There is minimal risk of cross-contamination between the materials, however the vanadium is an expensive material and the pentoxide utilized is considered a hazard after it is no longer usable. Another type of flow battery utilizes iron-chrome. Its advantage is in the use of low cost reactants, however it currently only provides for smaller type systems in comparison to the zinc-bromine or vanadium redox embodiments. There are additional chemical couples that could be utilized in a flow battery configuration.

Flow batteries typically use carbon felt electrodes. This kind of configuration is advantageous in that the carbon electrodes are chemically compatible with the typical anolyte and catholyte solutions and provide relatively high surface area and good electrical conductivity. The carbon felt provides for a high number of reaction sites and is a discrete component that is sandwiched or disposed between the bipolar plates, which are typically a solid carbon or conductive polymer material, and the membrane separator. The carbon felts are directly in contact with the bipolar plate. Other materials that can be used for the electrodes are carbon or graphite particles that are embedded directly into the bipolar plates. The significant drawback of the carbon felt electrodes is that it limits the desired current density. In particular, the current densities are believed to be limited by the lack of surface area and the density of electroactive reaction sites.

Therefore, there is a need in the art for flow batteries which utilize electrodes that have improved surface areas so as to allow for a higher density of reaction sites and, thus, the ability to store and generate higher power output. There is also the need to provide such an improved electrode that minimizes system level cost.

SUMMARY OF THE INVENTION

In light of the foregoing, it is a first aspect of the present invention to provide high surface area flow battery electrodes.

Another aspect of the present invention is to provide a flow cell battery, comprising at least one anode compartment, at least one cathode compartment, a separator membrane disposed between each anode compartment and cathode compartment, each anode compartment and cathode compartment comprising a bipolar plate, fluid electrolyte and at least a carbon nanomaterial on the surface of the bipolar plate, wherein the fluid electrolyte flows around the carbon nanomaterial positioned proximally at least one side of the bipolar plate.

Yet another aspect of the present invention is a flow battery electrode utilized in a flow battery, wherein the flow battery electrode is maintained in either an anode or cathode compartment of a flow battery, wherein the compartment includes a bipolar plate adjacent a flow channel through which electrolyte flows, the flow battery electrode comprises a porous carbon nanomaterial structure adjacent the bipolar plate, wherein the porous carbon nanomaterial structure comprises either woven or non-woven filaments or a combination thereof.

Still another aspect of the present invention is to provide a method for constructing a flow cell battery comprising providing at least one anode compartment, providing at least one cathode compartment, disposing a separator membrane between each at least one anode compartment and each at least one cathode compartment, and providing each compartment with a bipolar plate and at least a carbon nanomaterial disposed on a surface of the bipolar plate, each compartment having a flow channel into which the carbon nanomaterial extends into the flow channel so that fluid electrolyte flows around nanomaterial.

BRIEF DESCRIPTION OF THE DRAWINGS

This and other features and advantages of the present invention will become better understood with regard to the following description, appended claims, and accompanying drawings wherein:

FIG. 6 schematically shows one method of forming a carbon felt infused with carbon nanomaterial according to the concepts of the present invention; and FIG. 7 schematically shows another method of forming a carbon felt infused with carbon nanomaterial according to the concepts of the present invention.

BEST MODE FOR CARRYING OUT THE INVENTION

Figure 1:
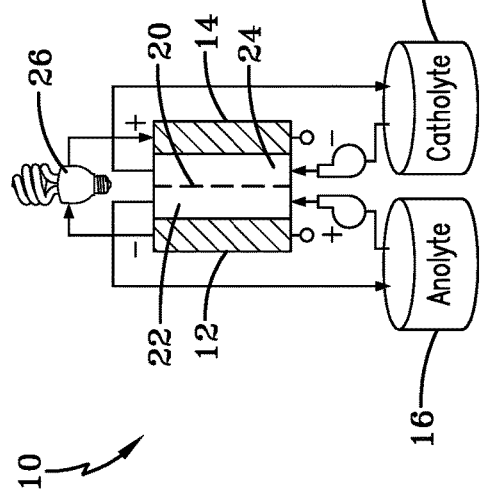
FIG. 1 is a schematic diagram of a prior art flow battery.
Figure 2:
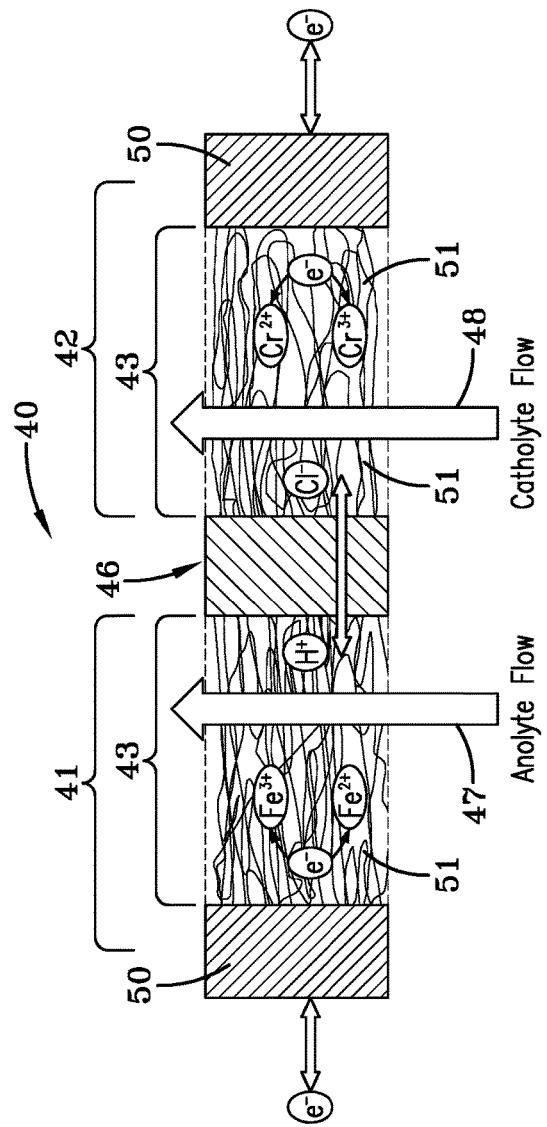
FIG. 2 is an enlarged detailed schematic diagram of a flow cell made in accordance with the concepts of the present invention.

Referring now to FIG. 2, it can be seen that a cell is designated generally by the numeral 40. The cell 40 may be provided in a single configuration or multiple cells may be stacked adjacent one another and utilized to operate as a flow cell battery. Each cell 40 provides at least one anode compartment 41 and at least one cathode compartment 42. When multiple compartments are provided in a cell 40, the anode compartments 41 are interleaved with the cathode compartments 42. Each compartment 41/42 includes a flow channel 43, wherein each flow channel has associated therewith an electrode which is either an anode or a cathode. As will become apparent as the description proceeds, each anode/cathode compartment 41/42 functions as an electrode that enables the flow of electrons to enable storage of electrical energy generated by a source or delivery of electrons to an electrical load.

The two flow channels are divided by a separator membrane 46 which is centrally disposed between each compartment or electrode and allows for ionic conductivity between an anolyte flow 47 and a catholyte flow 48. In the present embodiment, the separator membrane 46 allows ionic current flow via $H^+$ and/or $Cl^-$ species or the like, while preventing migration of the redox species such as, but not limited to, $Fe^{2+}$ $Fe^{3+}$, $Cr^{2+}$ $Cr^{3+}$, $V^{2+}/V^{3+}/V^{4+}/V^{5+}$ and $Ce^{3+}/Ce^{4+}$ or the like. Each cell 40 is contained within a pair of bipolar plates 50 which are electrically conductive. In particular, each compartment 41/42 has associated therewith a bipolar plate 50. It will be appreciated that the bipolar plates are current collectors connected in a bipolar topology. The bipolar plate or current collector prevents any mass transfer between adjacent flow regions while maintaining electrical continuity between each cell. Those skilled in the art will recognize that for a multiple cell configuration, bipolar plates will be shared between cells. Disposed between the bipolar plate and the respective membrane is a porous material 51 which is part of each compartment 41/42. The material 51, in conjunction with the adjacent bipolar plate, function as high surface area electrodes with catalyst sites where electrons from the bipolar plate 50 can reach the redox species of the anolyte and catholyte fluids flowing through the adjacent flow channels 43.

In order to maximize the number of catalyst sites, the filler material comprises nanomaterials and, specifically, carbon nanomaterials. As used herein, carbon nanomaterials include, but are not limited to, carbon nanotubes, carbon nanostructures and combinations thereof in any ratio. Generally, as used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTs), multi-walled carbon nanotubes (MWNTs). CNTs can be capped by a fullerene-like structure or open-ended. CNTs include those that encapsulate other materials. CNTs appear in branched networks, entangled networks, and combinations thereof. The CNTs prepared on the substrate as the CNS structure can include individual CNT motifs from exclusive MWNTs, SWNTs, or DWNTs or the CNS can include mixtures of CNT these motifs. As used herein, carbon nanostructures (CNS) comprise a polymer-like structure comprising carbon nanotubes (CNTs) as a monomer unit, the CNS comprising a highly entangled carbon nanotube-based web-like structure that includes combinations of CNTs that are interdigitated, branched, crosslinked, and share common walls. Indeed, the carbon nanostructures disclosed herein comprise carbon nanotubes (CNTs) in a network having a complex morphology. Without being bound by theory, it has been indicated that this complex morphology may be the result of the preparation of the CNS network on a substrate under CNT growth conditions at a rapid rate on the order of several microns per second. This rapid CNT growth rate coupled with the close proximity of the nascent CNTs may provide the observed branching, crosslinking, and shared wall motifs. For simplicity, the following discussion may refer to the CNS disposed on the substrate, filament or fiber interchangeably as CNTs because CNTs comprise the major structural component of the CNS network. Carbon nanostructures also refer to any carbon allotropic structure having at least one dimension in the nanoscale. nanoscale dimensions include any dimension ranging from between 0.1 nm to about 1000 nm Formation of such structures can be found in U.S. Publication No. 2011/0124253, which is hereby incorporated by reference.

The porous filler material 51 sometimes may include a felt made up of filaments which may be a woven or non-woven carbon, graphite or like material, wherein the felt carries or is infused with the above-described carbon nanomaterial. The materials 51 typically provide excellent chemical resistance and inert properties with high porosity and good electrical conductivity. In some embodiments if woven porous filler material is used, the resulting structure may use two-dimensional weaving patterns, three dimensional weaving patterns, or combinations thereof. In embodiments where non-woven porous filler material is used, those materials can be fabricated by hydroentanglement, electrostatic flocking, standard flocking, air lay methods, wet lay methods and any combination thereof. In some embodiments the filaments in the woven or non-woven material may be infused with the carbon nanotubes or nanostructures, without carbon nanostructures, or combinations thereof, in any ratio found effective. Moreover, in any embodiment, the filaments utilized in either woven or non-woven embodiments may be constructed from metals, metal oxides, carbon, glass, polymers, metalized carbon, metalized glass, metalized polymer and any combination thereof. Additionally, in some embodiments, the carbon nanostructures are infused to the filaments by direct growth or by submersion into a carbon nanostructure dispersion.

Figure 3:
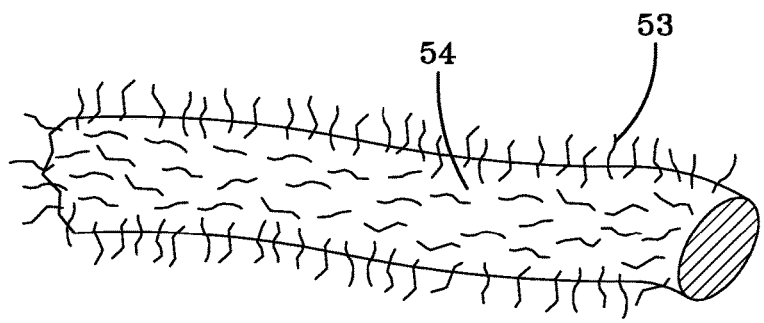
FIG. 3 is an enlarged schematic diagram of a carbon fiber with carbon nanomaterial extending from its surface.

Generally, all of the embodiments described herein provide for application of a low production cost method of modifying the bipolar plate, or an associated electrode, directly or indirectly, with some associated material enhanced with carbon nanomaterial. In other words, carbon nanomaterial is positioned proximally on at least one side of the bipolar plate or current collector. This could be done by placing the nanomaterial proximally adjacent the plate, or infusing directly/coating/growing the nanomaterial on the plate, or coating the associated electrode. These porous carbon nanomaterial placements or coatings provide up to several orders of magnitude greater active surface area than carbon felt, thereby enabling higher current density through the system. The modified bipolar plates provide a conductive region that extends fully between one side of the bipolar plate and the adjacent separator membrane. It is believed that the key to achieve reduced costs is the ability to apply these carbon nanomaterial variations at a low cost. Skilled artisans will appreciate that the carbon nanomaterial is grown in such a manner that the nanomaterial generally extends substantially perpendicularly, or randomly, or in any angular orientation from a surface. For example, as schematically shown in FIG. 3, carbon nanotubes 53 are shown extending radially from a carbon fiber 54. The number or density of nanotubes or other nanostructures extending from a surface may be varied as appropriate. Additionally, the nanotubes or other nanostructures may be grown to extend from any shape surface—planar, curved, spherical, ridged, and so on. The tubes or structures may be strictly parallel with each other, form in a radial arrangement or entangled in a mesh.

Figures 4, 5:
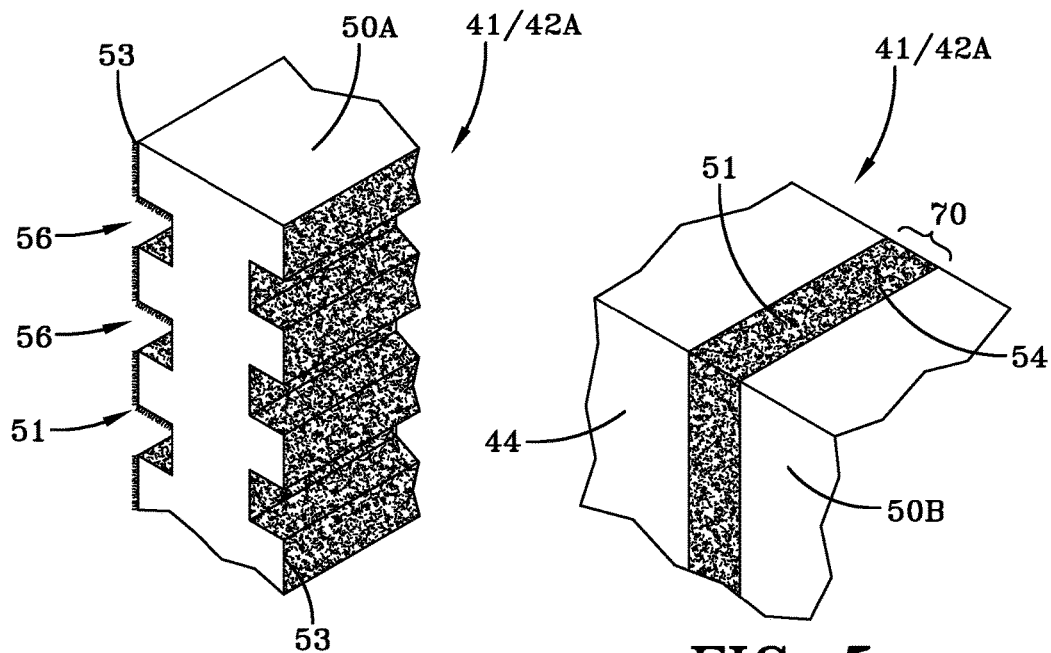
FIG. 4 is a partial schematic perspective representation of a bipolar plate with a covering of carbon nanomaterial according to the concepts of the present invention.
FIG. 5 is an enlarged schematic representation of a carbon felt infused with carbon nanomaterial according to the concepts of the present invention.

In a first embodiment shown in FIG. 4, it can be seen that a compartment 41/42A comprises a bipolar plate 50A in which the porous filler material 51 comprises a carbon nanomaterial layer which is provided on each side of the plate. In this embodiment, the bipolar plate 50A is provided with a plurality of channels 56 so as to provide a three dimensional structure on either one or both sides of plate 50A so as to allow either the anolyte or catholyte to flow adjacent thereto. The material 51 comprises carbon nanomaterial such as carbon nanotubes 53 that are grown directly, partially or completely, onto the outer surface of the bipolar plate 50A. The nanotubes 53 are relatively much smaller than the thickness of the bipolar plate. In this embodiment, the nanotubes are aligned or oriented so as to extend primarily perpendicularly from the bipolar plate and also extend into the channels 56. In other embodiments, the carbon nanomaterial may be carbon nanostructures that extend randomly, angularly, or in defined or undefined patterns. As is understood, the plate consists of an electrically conductive material that separates the cells and is resistant to corrosion. In a variation of this embodiment, the bipolar plate could be provided without channels, as a flat surface, with the carbon nanomaterial extending substantially perpendicularly therefrom. The carbon nanomaterial could cover the entire plate surface or the nanomaterial could be selectively patterned in such a way to form flow patterns or paths for the anolyte or catholyte.

This implementation has the benefit over the current art of entirely eliminating a component, the carbon felt, in a cell since the electrode functions and bipolar plate functions are effectively integrated with one another. Prior art devices simply provided a carbon felt on either side of the bipolar plates wherein the felt provided reaction sites but wherein the reaction sites are randomly disposed about the carbon felt. In distinct contrast, the use of carbon nanotubes 53 or other carbon nanostructures in the channels 56 or on the surface as shown in FIG. 4 greatly increases the surface area though which the anolyte and catholyte fluids must flow and, as such, the fluids are exposed to a greater number of reaction sites.

Referring now to FIG. 5, it can be seen that in another embodiment a compartment 41/42B comprises a bipolar plate 50B. In this embodiment, the porous filler material 51 is a carbon nanomaterial infused felt 70, sometimes referred to as an infused fabric, that is disposed on each side of the bipolar plate and placed adjacent the respective separator membranes 44. The carbon nanomaterial infused felt is inserted into the compartment in place of the prior art carbon felt. The carbon nanomaterial infused fabric or tow provides for improved chemical resistance and electrical conductivity and, as in the previous embodiment, much higher surface area to facilitate high current densities.

For the embodiment shown in FIG. 5, the felt 70 may be constructed in a number of ways. A first method of construction, represented in FIG. 6, is to first manufacture carbon or graphite fibers or filaments 54 and then grow carbon nanotubes 53 or other carbon nanostructures on the fibers 54. The infused fibers are then assembled to one another, either in long thread or chopped form, so as to form a non-woven carbon nanomaterial infused felt 70'. A second method of construction represented in FIG. 7 is to manufacture the filaments 54 and then form them into a non-woven felt 52. Next, the felt is processed so as to grow carbon nanotubes 53 or other carbon nanostructures directly on the filaments 54 so as to form a carbon nanomaterial infused felt 70". As noted previously, the felt 70, 70', 70" is a porous non-woven configuration with many openings and interstices. Accordingly, the nanomaterial proliferates throughout the felt and contacts the bipolar plate and membrane when those components are assembled. Multiple woven processes could also be used to fabricate a porous electrode structure from fibers or filaments. Indeed, any woven or non-woven three dimensional structure employing the nanomaterial 53 could be used.

This embodiment and the related methods of construction are advantageous in that the carbon felt in conventional flow battery stack structures is replaced by a felt that is equivalent at the macroscale, but has up to one to two orders of magnitude or greater surface area, increasing the reaction rate in the anolyte or catholyte and thus increasing the current density of the system without introduced any significant energy loss on the electrochemical reactions. In this embodiment, the carbon felt is provided in combination with the carbon nanomaterial that is easily grown on the carbon felt material.

The embodiments shown in FIGS. 4 and 5 may be implemented by treating the carbon nanomaterial-coated bipolar plates and any variation of the carbon nanomaterial with various forms of treatments such as thermal, chemical, so as to increase the number of active sites for the pertinent flow thereby allowing more redox reactions to take place. It will be appreciated that variations in the carbon nanotube or nanostructure growth processes enable the optimization of the carbon nanomaterial characteristics for redox activity, electrochemical activity, electrical conductivity and chemical resistance by controlling the nanomaterial characteristics such as the configuration of multi-walls, length, density, chirality, defects and addition of functional groups.

The disclosed configurations are advantageous in that the carbon surface area is increased by up to an order of magnitude or more over the carbon felt and other known prior art configurations. This increase in the microscopic and nanoscopic surface area increases the number of sites available for the associated flow battery anode or cathode reactions to occur. This enables the reactions to take place at a higher rate for a given macroscopic surface area, thereby enabling higher power densities in the cell stack and potentially lower cost systems due to the reduction in material costs per unit, power and energy. It is also believed that this configuration enables the cell and the complete cell stack to operate with higher round-trip efficiencies and reduces the various overpotential, resistive, and/or electrical losses in the system.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A flow battery electrode configured to be utilized in a flow battery, wherein the flow battery electrode is disposed in contact with a bipolar plate of one of an anode compartment and a cathode compartment of the flow battery, the flow battery electrode comprising a porous carbon nanomaterial structure comprising a carbon nanomaterial, at least a portion of the carbon nanomaterial of the porous carbon nanomaterial structure disposed in direct physical contact with the bipolar plate of one of the anode compartment and the cathode compartment of the flow battery, the porous carbon nanomaterial structure configured to permit an electrolyte in a flow channel to flow through and about the porous carbon nanomaterial structure to contact the carbon nanomaterial to directly react with the carbon nanomaterial.

2. The flow battery electrode according to claim 1, wherein the porous carbon nanomaterial structure is a woven structure comprising a weaving pattern having at least two dimensions.

3. The flow battery electrode according to claim 2, wherein the weaving pattern has three dimensions.

4. The flow battery electrode according to claim 1, wherein the porous carbon nanomaterial structure is a non-woven structure.

5. The flow battery electrode according to claim 4, wherein the nonwoven structure is fabricated from a process selected from the group consisting of hydroentanglement, electrostatic flocking, standard flocking, air lay methods, wet lay methods, and stitch bonding.

6. The flow battery electrode according to claim 4, wherein the porous carbon nanomaterial structure comprises a plurality of filaments.

7. The flow battery electrode according to claim 6, wherein the plurality of filaments is selected from the group consisting of metals, metal oxides, carbon, glass, polymers, metalized carbon, metalized glass, and metalized polymer.

8. The flow battery electrode according to claim 7, wherein each of the plurality of filaments is at least partially infused with the carbon nanomaterial.

9. The flow battery electrode according to claim 8, wherein each of the plurality of filaments is infused with the carbon nanomaterial by one of direct growth of the carbon nanomaterial and submerging a structure comprising the filaments into a carbon nanostructure dispersion.

10. A method for constructing a flow cell battery comprising:
providing an anode compartment forming an anode flow channel, the anode compartment comprising an anode bipolar plate and an anode electrode in contact with the anode bipolar plate, the anode electrode comprising a porous carbon nanomaterial anode structure configured to permit an anode electrolyte in the anode flow channel to flow through and about the porous carbon nanomaterial anode structure to contact an anode carbon nanomaterial to directly react with the anode carbon nanomaterial, at least a portion of the anode carbon nanomaterial of the porous carbon nanomaterial anode structure in direct physical contact with the anode bipolar plate;
providing a cathode compartment forming a cathode flow channel, the cathode compartment comprising a cathode bipolar plate and a cathode electrode in contact with the cathode bipolar plate, the cathode electrode comprising a porous carbon nanomaterial cathode structure configured to permit a cathode electrolyte in the cathode flow channel to flow through and about the porous carbon nanomaterial cathode structure to contact a cathode carbon nanomaterial to directly react with the cathode carbon nanomaterial, at least a portion of the cathode carbon nanomaterial of the porous carbon nanomaterial cathode structure in direct physical contact with the cathode bipolar plate; and disposing a separator membrane between the anode compartment and the cathode compartment.

11. The method according to claim 10, further comprising:
forming the anode carbon nanomaterial on carbon fibers;
cutting the carbon fibers; and
forming the cut carbon fibers into a non-woven felt that is positioned adjacent at least one side of the anode bipolar plate to form the porous carbon nanomaterial anode structure.

12. The method according to claim 10, further comprising:
forming a carbon felt;
forming the anode carbon nanomaterial on the carbon felt to form the porous carbon nanomaterial anode structure; and
positioning the carbon felt adjacent at least one side of the anode bipolar plate.

13. The method according to claim 10, further comprising:
forming the anode carbon nanomaterial into a three dimensional structure to form the porous carbon nanomaterial anode structure.

14. A flow cell battery, comprising:
a first compartment forming a first flow channel, the first compartment comprising:
a first bipolar plate;
a first fluid electrolyte; and
a first flow battery electrode in contact with the first bipolar plate, the first flow battery electrode comprising a first porous carbon nanomaterial structure configured to permit the first fluid electrolyte in the first flow channel to flow through and about the first porous carbon nanomaterial structure to contact a first carbon nanomaterial to directly react with the first carbon nanomaterial, at least a portion of the first carbon nanomaterial of the first porous carbon nanomaterial structure in direct physical contact with the first bipolar plate;
a second compartment forming a second flow channel, the second compartment comprising:
a second bipolar plate;
a second fluid electrolyte; and
a second flow battery electrode in contact with the second bipolar plate, the second flow battery electrode comprising a second porous carbon nanomaterial structure configured to permit the second fluid electrolyte in the second flow channel to flow through and about the second porous carbon nanomaterial structure to contact a second carbon nanomaterial to directly react with the second carbon nanomaterial, at least a portion of the second carbon nanomaterial of the second porous carbon nanomaterial structure in direct physical contact with the second bipolar plate; and
a separator membrane disposed between the first compartment and the second compartment.

15. The flow cell battery according to claim 14, wherein at least one side of the first bipolar plate has a plurality of channels configured to provide an embedded flow pattern for the first fluid electrolyte.

16. The flow cell battery according to claim 15, wherein each of the plurality of channels is covered with the first carbon nanomaterial.

17. The flow cell battery according to claim 16, wherein the first carbon nanomaterial is substantially perpendicular to the first bipolar plate.

18. The flow cell battery according to claim 14, wherein the first flow battery electrode is integrated into the first bipolar plate.

19. The flow cell battery according to claim 18, wherein the first bipolar plate is covered by the first carbon nanomaterial.

20. The flow cell battery according to claim 19, wherein the first carbon nanomaterial is substantially perpendicular to the first bipolar plate.

21. The flow battery electrode according to claim 1, wherein the porous carbon nanomaterial structure is directly attached to the bipolar plate of one of the anode compartment and the cathode compartment of the flow battery.

22. The flow battery electrode according to claim 1, wherein the porous carbon nanomaterial structure is configured to be disposed in direct physical contact with a separator membrane between the anode compartment and the cathode compartment of the flow battery.

23. The method according to claim 10, wherein the porous carbon nanomaterial anode structure is directly attached to the anode bipolar plate, and the porous carbon nanomaterial cathode structure is directly attached to the cathode bipolar plate.

24. The method according to claim 10, wherein the porous carbon nanomaterial anode structure is in direct physical contact with the separator membrane, and the porous carbon nanomaterial cathode structure is in direct physical contact with the cathode bipolar plate.

25. The flow cell battery according to claim 14, wherein the first porous carbon nanomaterial structure is directly attached to the first bipolar plate, and the second porous carbon nanomaterial structure is directly attached to the second bipolar plate.

26. The flow cell battery according to claim 14, wherein the first porous carbon nanomaterial structure is in direct physical contact with the separator membrane, and the second porous carbon nanomaterial structure is in direct physical contact with the separator membrane.

* * * * *